United States Patent
Ehrman et al.

(10) Patent No.: US 6,610,103 B2
(45) Date of Patent: Aug. 26, 2003

(54) METHOD FOR PROVIDING PRECISE CUMULATIVE UPDATES AND FIXES TO A SOFTWARE PRODUCT

(75) Inventors: John Robert Ehrman, Sunnyvale, CA (US); Robert Kent McNeill, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/016,368

(22) Filed: Jan. 30, 1998

(65) Prior Publication Data
US 2001/0056441 A1 Dec. 27, 2001

(51) Int. Cl.[7] .......................... G06F 15/00; G06F 17/30; G06F 17/00; G06F 17/21
(52) U.S. Cl. .......................... 715/511; 715/531; 707/10; 707/203
(58) Field of Search .................. 715/511, 531; 707/203, 10; 709/223, 217, 221; 395/712, 500.43; 345/338; 717/1

(56) References Cited

U.S. PATENT DOCUMENTS

| | | | |
|---|---|---|---|
| 5,452,206 A | * 9/1995 | Turrietta et al. | 707/531 |
| 5,535,422 A | * 7/1996 | Chiang et al. | 345/338 |
| 5,732,275 A | * 3/1998 | Kullick et al. | 395/712 |
| 5,758,358 A | * 5/1998 | Ebbo | 707/203 |
| 5,805,891 A | * 9/1998 | Bizuneh et al. | 395/704 |
| 5,809,251 A | * 9/1998 | May et al. | 709/223 |
| 5,809,287 A | * 9/1998 | Stupek, Jr. et al. | 395/500.43 |
| 5,835,911 A | * 11/1998 | Nakagawa et al. | 707/203 |
| 5,845,077 A | * 12/1998 | Fawcett | 709/221 |
| 5,903,897 A | * 5/1999 | Carrier et al. | 707/203 |
| 5,919,247 A | * 7/1999 | Van Hoff et al. | 709/217 |
| 5,949,999 A | * 9/1999 | Song et al. | 717/1 |
| 6,185,584 B1 | * 2/2001 | Paik et al. | 707/511 |
| 6,377,951 B1 | * 4/2002 | Campbell | 707/10 |

OTHER PUBLICATIONS

Safe Mechanism for Installing Operating System Updates with Applications, IBM Technical Disclosure Bulletin, vol. 41, issue 1, pp. 557–560, Jan. 1998.*
Lincoln, A.D., Computer aided documentation for software maintenance, IEEE Issues in Computer Support for Documentation and Manuals, pp. 7/1–7/3, 1993.*
Lucas, C. et al., Managing software evolution through reuse contracts, IEEE Software Maintenance and Reengineering, Eromicro 97, Mar. 17–19, 1997, pp. 165–168.*
PR–Tracker Version 2.09 (software application), Aug. 29, 1997 by Softwise Company, screenshots pp. 1–11.*
Program temporary fix—whatis.com, <http://searchDomino.techtarget.com/sDefinition/0,,sid4_gci214488,00.html>, last updated Feb. 22, 2001, downloaded on Feb. 24, 2003, pp. 1–2.*
IBM Corporation, SC26–4941 and SC26–8264 Programmer's Guide, Apr. 3, 1997, pp. 1–5.

* cited by examiner

Primary Examiner—Joseph H. Feild
Assistant Examiner—William L. Bashore
(74) Attorney, Agent, or Firm—David W. Victor; Konrad, Raynes, Victor & Mann

(57) ABSTRACT

Disclosed is a system for providing information to a user on modifications made to a base software product with a program temporary fix. The program temporary fix is applied to the base software product. The program temporary fix includes informational text describing how the program temporary fix modifies the base software product. The informational text included with the program temporary fix is applied to informational text provided with the base software product to generate cumulative informational text. The cumulative informational text describes the base software product as modified by the program temporary fix. The cumulative informational text may be accessed and presented to the user.

32 Claims, 3 Drawing Sheets

METHOD FOR PROVIDING PRECISE CUMULATIVE UPDATES AND FIXES TO A SOFTWARE PRODUCT

BACKGROUND OF THE INVENTION

1. Field of the Invention

The present invention relates generally to a computer-implemented method for providing information on updates and/or fixes to a software product.

2. Description of the Related Art

When a software product is released, documentation is generally provided describing the functions and operations of the software. Before the next release of the software product, the producer may provide interim updates and/or fixes for the software product. These updates and/or fixes between releases are referred to as program temporary fixes (PTFs).

Often, there are several PTFs between major releases of the software product. Users may be unaware that PTFs have been installed and how they modify the software product. Further, the updates and fixes installed to the software product by way of PTFs are not described in the original documentation provided with the release of the software product. Moreover, separate documentation provided with a PTF is often lost, discarded or not readily available. As a result, at any given time, there is no way for the user to immediately determine exactly what changes have been made to any given copy of the software product, how those changes affect the functions and operations of the software product, and which sections of the original documentation are outdated. Furthermore, multiple copies of a product may be installed that are at unknown and/or different fix levels. Thus, there is a need in the art for improved methods of providing informational text or documentation concerning PTFs applied to the software product to users with the copy of the product they are using.

SUMMARY OF THE INVENTION

To overcome the limitations in the prior art described above, and to overcome other limitations that will become apparent upon reading and understanding the present specification, the present invention discloses a method, apparatus, and article of manufacture for providing information to a user on modifications made to a base software product with a program temporary fix. One or more program temporary fixes are applied to the base software product. The program temporary fix includes informational text describing how the program temporary fix modifies the base software product. The informational text included with the program temporary fix is applied to informational text provided with the base software product to generate cumulative informational text. The cumulative informational text describes the base software product as modified by the program temporary fix. The cumulative informational text may be accessed and presented to the user.

In further embodiments, the program temporary fix can comprise at least one update or fix to the base software product. In yet further embodiments, a second program temporary fix can be applied to a cumulative software product comprised of the base software product and the program temporary fix previously applied. In such case, the second program temporary fix would include informational text describing how the second program temporary fix modifies the cumulative software product.

An object of the present invention is to allow the user to readily access information describing the effect of installed PTFs on the base software product. Another object of the present invention is to provide a tool for accessing and presenting such information. Still another object of the present invention is to make the base software product and the applied PTFs self-describing entities. Yet another object is to consolidate information in a readily accessible location so users do not need to contact technical support facilities of the software developer or spend considerable time searching for technical support information in different locations.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and in which is shown by way of illustration embodiments of the invention. It is understood that other embodiments may be utilized and structural changes may be made without departing from the scope of the present invention.

Overview

The present invention discloses a method, apparatus, and article of manufacture for providing informational text describing the updates and fixes of a program temporary fix (PTF), wherein the informational text is embedded within the PTF. Moreover, the user may invoke an application program to access this informational text within the PTF. The application program is capable of displaying, printing, searching, and extracting informational text. Preferably, the informational text includes any manner of descriptive information such as a cumulative version identifier of the base software product listing all installed PTFs, a description of how the PTF modifies the base software product, a description of errors in the base software product that are fixed by the PTF, and a description of information provided with the base software product prior to the application of the PTF that is inaccurate, incomplete or added as a result of the application of the PTF.

Hardware Environment

Figure 1:
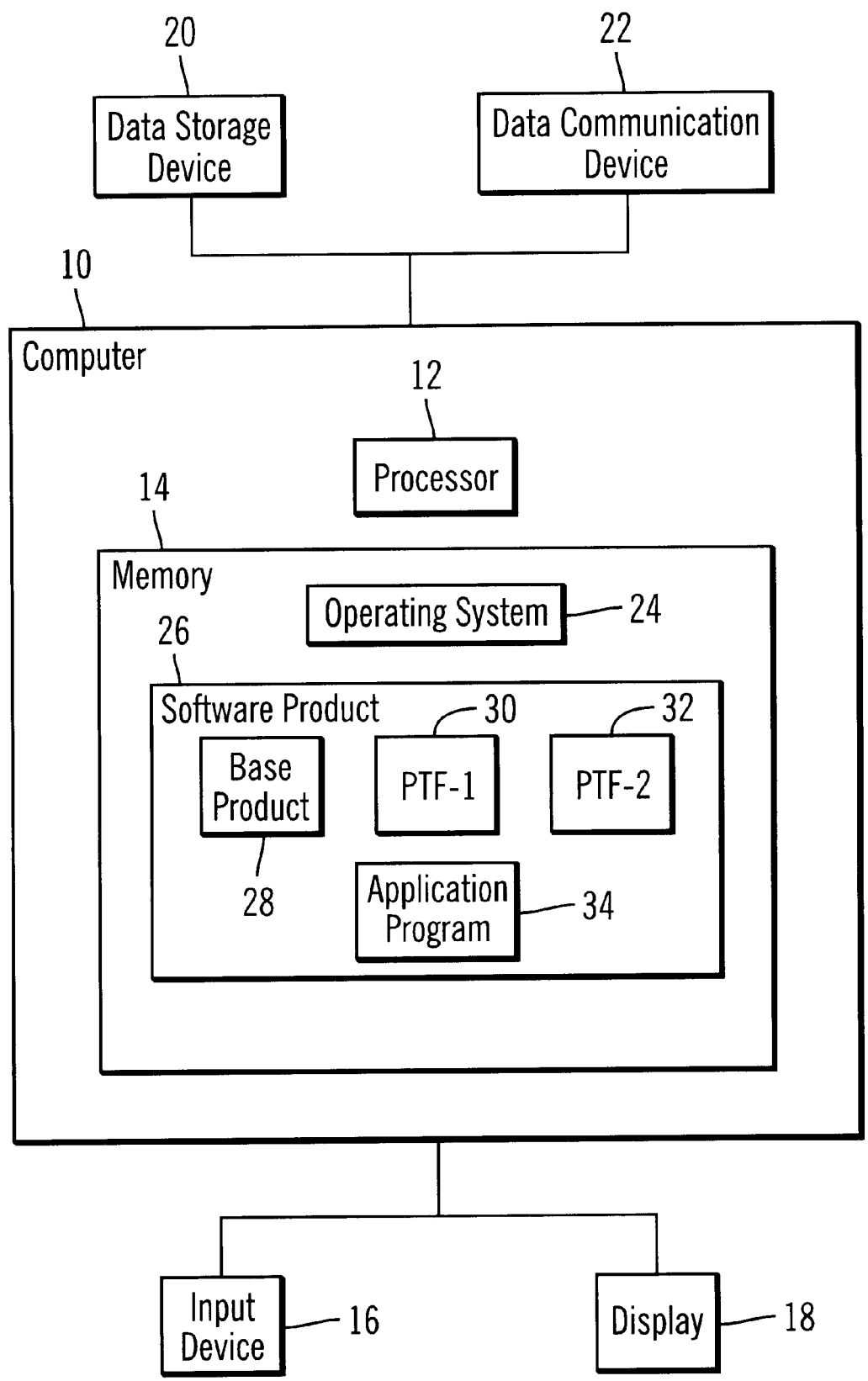
FIG. 1 is a block diagram illustrating an exemplary hardware/software environment in which preferred embodiments of the present invention are implemented.

FIG. 1 is a block diagram illustrating an exemplary hardware/software environment in which preferred embodiments of the present invention are implemented. In the exemplary environment, a computer 10 may include, inter alia, a processor 12, memory 14 (e.g., RAM, ROM, etc.), an input device 16 (e.g., keyboard, files, mouse pointing device, etc.), display 18 (e.g., CRT, printers, LCD displays, etc.), as well as a data storage device 20 (e.g., fixed and/or removable magnetic and/or optical disk drives, files, etc.), and/or data communication device 22 (e.g., modems, network interfaces, etc.). It is envisioned that attached to the computer 10 may be other peripheral devices such as printers, etc. Those skilled in the art will recognize that any combination of the above components, or any number of different components, peripherals, and other devices known in the art, may be used with the computer 10.

The computer 10 operates under the control of an operating system (OS) 24, such as OS/390, MVS, VM, AIX, OS/2, UNIX, WINDOWS, MACINTOSH, etc. The operating system 24 is booted into the memory 14 of the computer 10 for execution when the computer 10 is powered-on or reset. In turn, the operating system 24 then controls the execution of a software product 26, which is comprised of one or more computer programs.

In the exemplary environment of the present invention, the software product 26 comprises a base software product 28 and two program temporary fixes PTF-1 30 and PTF-2 32 that apply upgrades and fixes to the base software product 28. Also included is an application program 34 that presents informational text to the user describing how the updates and fixes installed with the PTFs 30 and 32 affect the functions and operations of the base software product 28. The functions and operations performed by the application program 34 may be embedded within the base product 28 or implemented as a separate application program 34.

Generally, the operating system 24 and the software product 26 are tangibly embodied in and/or retrieved from the data storage devices 20 and/or a remote device (not shown) accessed via the data communications devices 22, and loaded into the memory 14 for execution by the computer 10. The operating system 24 and the computer programs 26 are comprised of instructions that, when read and executed by the computer 10, cause the computer 10 to perform the steps or elements of the preferred embodiments.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier or medium that provides access to a computer program having the same or similar functionality. Of course, those skilled in the art will recognize many modifications may be made to this configuration without departing from the scope of the present invention.

Those skilled in the art will also recognize that the exemplary environment illustrated in FIG. 1 is not intended to limit the present invention. Indeed, those skilled in the art will recognize that other alternative hardware environments and programs may be used without departing from the scope of the present invention.

Program Temporary Fixes

Figure 2:
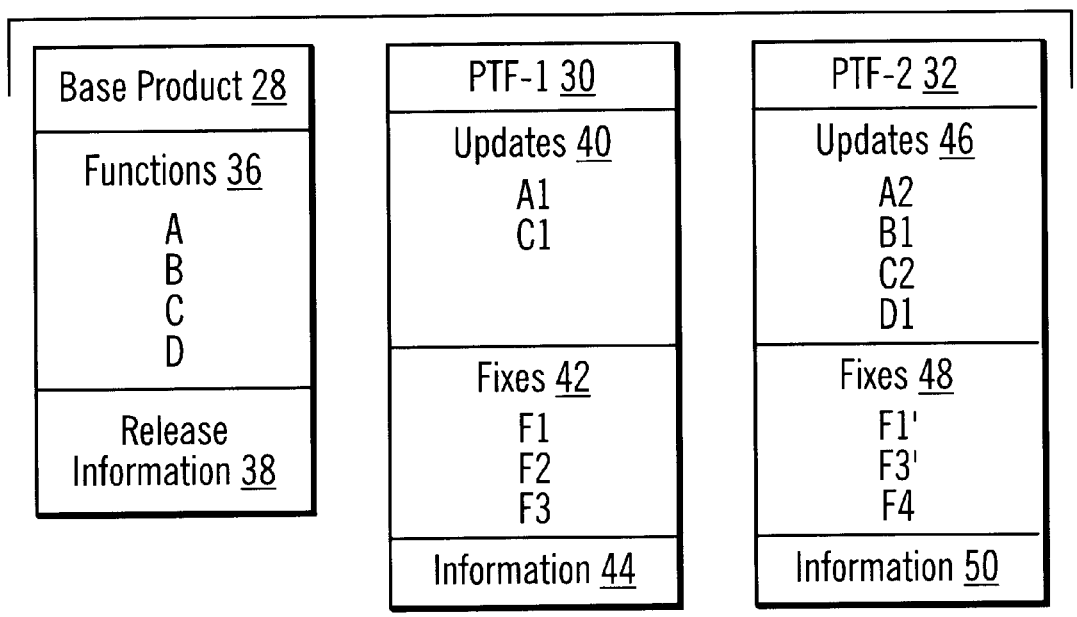
FIG. 2 is a block diagram of component functions and operations included in the base software product and the program temporary fixes.

FIG. 2 is a block diagram that illustrates elements of the base software product 28 and the PTFs 30 and 32 that are used to modify certain functions and operations in the base software product 28. In this example, the base software product 28 includes program functions 36 A, B, C, and D, as well as release information 38 describing the program functions 36.

Sometime after the release of the base software product 28, the software developer may provide PTF-1 30. The installation of PTF-1 30 modifies the program functions 36 A and C of the base software product 28 with updates 40 A1 and C1. The PTF-1 30 also provides fixes 42 F1, F2, and F3 that correct various bugs and problems in the base software product 28. PTF-1 30 further includes informational text 44 describing the updates 40 and fixes 42 and their effect on the base software product 28, as well as providing updates and corrections to the release information 38. Thus, after the user installs PTF-1 30, the base software product 28 includes program functions 36 A1, B, C1, and D.

Sometime after the release of PTF-1 30, the software developer may also provide PTF-2 32. The installation of PTF-2 32 updates the program functions 36 A1, B, C1, and D of the base software product 28 with updates 46 A2, B1, C2, and D1. PTF-2 32 also provides fixes 48 F1', F3', and F4 that correct various bugs and problems in the base software product 28 or in previous corrective service. PTF-2 32 includes informational text 50 providing updates and corrections to the informational texts 38, 44, as well as a description of the cumulative effect of both PTF-1 30 and PTF-2 32 on the base software product 28. Informational text 50 may modify or replace release information 38 and/or information 44 provided with PTF-1 30. Some parts of the informational text 38, 44 prior to the application of informational text 50 may be valid and other parts may be outdated. Nevertheless, the net effect when displaying information after the application of informational text 50 is that the cumulative corrections are more accurate than all information contained within previous informational texts 38, 44. After a user has installed PTF-1 30 and PTF-2 32, the base software product 26 includes modified program functions 36 A2, B1, C2, and D1 and the most accurate accompanying information.

The Application Program

A user relying on the release information 38 provided with the base software product 28 may discover that, after the installation of PTF-1 30 and PTF-2 32, the base software product 28 does not operate as described in the release information 38 because of the updates 40, 46 and fixes 42, 48 added by PTF-1 30 and PTF-2 32, respectively. For example, the description in the release information 38 of functions 36 (A, B, C, and D) may no longer be accurate because of the modified program functions 36 (A2, B1, C2, and D1) now present in the base software product 28, which modifications were made by way of PTF-1 30 and PTF-2 32. Moreover, the fixes F1, F1', F2, F3, F3', and F4 may also have altered the base software product 28 to operate in a manner not described in the release information 38.

A user would invoke the application program 34 to access information, resulting from the culmination of informational texts 38, 44, and 50, on the base software product 28 and all fixes and updates implemented through the application of PTF-1 30 and PTF-2 32. This informational text resulting from the culmination of informational texts 38, 44, and 50 includes, but is not limited to, the following descriptive information:

an identifier for the present version of the base software product 28, including which PTFs 30 and 32 have been added;

what functional capabilities have been added, enhanced or removed from the base software product 28;

how the installation of the PTFs 30 and 32 alters the operation of the base software product 28 described in the release information 38;

updates that have been applied to the base software product 28;

fixes that have been applied to the base software product 28; and which sections of the release information 38 provided with the base software product 28 (and any previously installed PTFs) are inapplicable or enhanced as a result of applying PTF-1 30 and PTF-2 32 to the base product 28.

When invoked, the application program 34 accesses and extracts the informational text 38, 44, and/or 50 and then makes the extracted information available to the user. The application program 34 may provide an option for printing or displaying the informational text 38, 44, 50, or for storing the informational text 38, 44, 50 in a user selected location for later use. In further embodiments, the application program 34 may include a search feature that allows the user to search or select the informational text 38, 44, 50 and any portions thereof. In this way, the user can immediately obtain information on the base product 28 as modified by the PTFs 30, 32 and how the base software product 28 has been changed as a result of adding the PTFs 30, 32.

In preferred embodiments, the application program 34 may be invoked as a standalone program or it may be invoked as a module of an installation program (not shown) or in other ways known in the art. Alternatively, in embodiments where the application program 34 is embedded in the base product 28, the application program 34 may be invoked from the user interface of the base product 28. The application program 34 may include commands or invocation arguments that allow the user to specify whether to extract, display, search, print, and selectively save the information 38, 44, 50.

Flowchart

Figure 3:
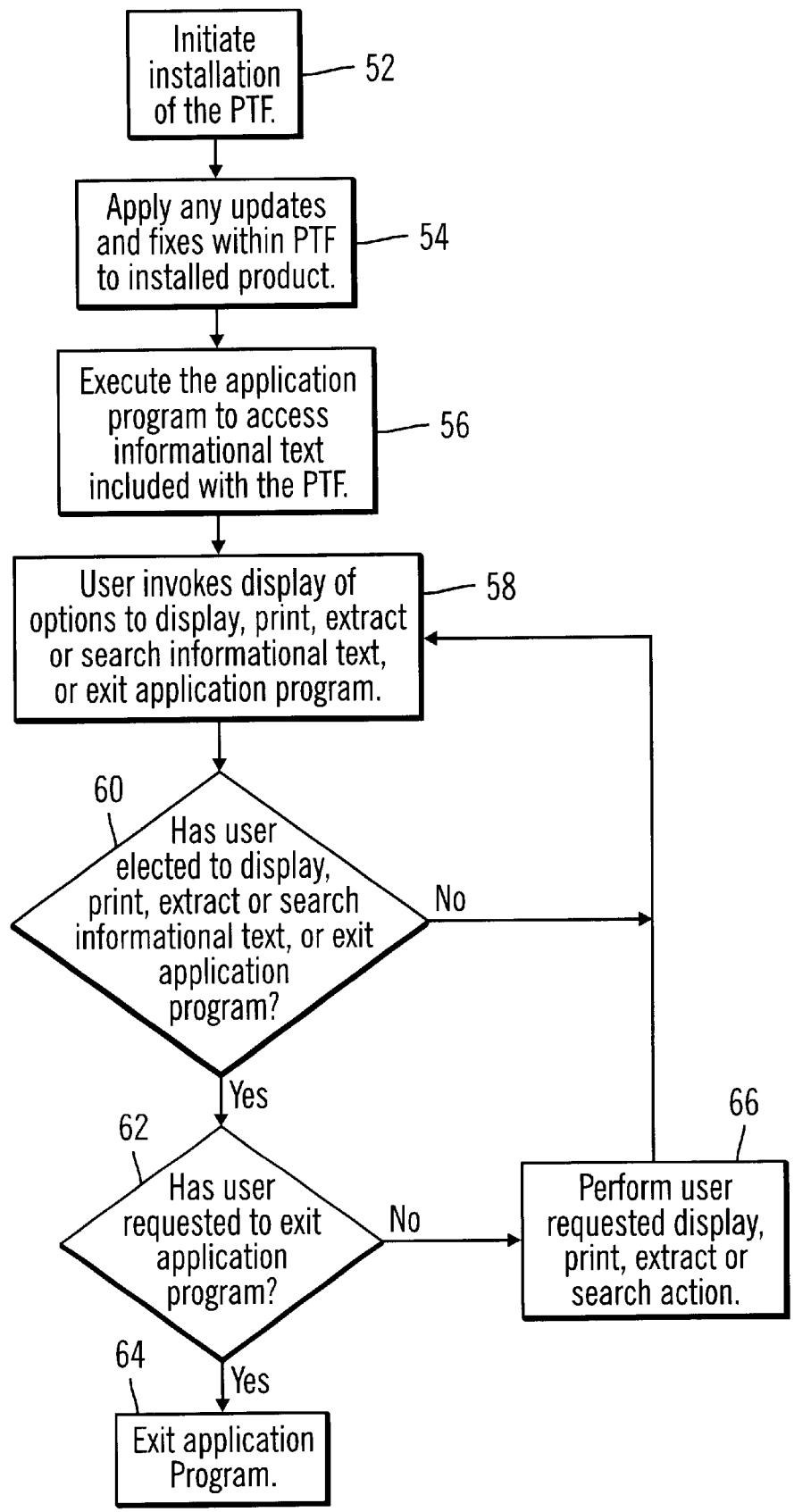
FIG. 3 is a flowchart that illustrates general logic to apply program temporary fixes and generate information thereon in accordance with preferred embodiments of the present invention.

FIG. 3 is a flowchart illustrating the logic used to apply the PTFs to the base software product. Such logic may be implemented in the software of the base product 28 and any PTFs 30, 32 applied thereto. Those skilled in the art will recognize that this logic is provided for illustrative purposes only and that different logic may be used to accomplish the same results.

Block 52 represents the computer 8 initiating the installation of the PTF program (e.g. either PTF-1 30 or PTF-2 32), which includes any updates and/or fixes to the functions 28 and release information 38 of the base product. The PTF program may be installed by service personnel, the user or automatically during log-on/initialization. From block 52 control proceeds to block 54 which represents the computer 8 applying any updates 40, 46 and fixes 42, 48 included in the installed PTF 30, 32 to the base software product 28. The PTFs 30, 32 would further apply informational text 44, 50 to the available informational text describing how the PTF modifies the base software product 28. If a subsequent PTF is applied, such as PTF-2 32, then the subsequent PTF would modify the base software product 28 as modified by any previous PTFs and the release information 38 as modified by informational texts added during previous PTF installations. This yields a cumulative software product 28 and accompanying information that incorporates the base product 28 and all previous PTF modifications thereto.

From block 54, control proceeds to block 56 which represents the computer 8 executing the application program 34 to access the informational text 38, 44, 50 from the base product 28 and/or PTF 30, 32. The application program 34 can be invoked even if a PTF has not been applied in order to access the release information 38. From block 56, control proceeds to block 58 which represents the user invoking the display 18 of a user interface of options to display, print, extract, store or search informational text 38, 44, 50, or exit the application program 34. Those skilled in the art will appreciate that in alternative embodiments a display 18 would not be used to display options to the user. Instead, the user would enter a command to display, print, store or search informational text 38, 44, 50, or exit the application program 34.

From block 58, control proceeds to block 60 which is a decision block representing the computer 8 determining whether the user has elected to display, print, search, extract or store informational text 38, 44, 50, or exit options. If so, control proceeds to block 62; otherwise back to block 60 to await user selection of an option. Block 62 is a decision block representing the computer 8 determining whether the user has requested to exit the application program 34. If so, control proceeds to block 64; otherwise block 66. Block 64 represents the computer 8 exiting the application program 34. Block 66 represents the computer performing the user requested display, print, extract, store or search options. From block 66 control proceeds back to block 58.

Conclusion

This concludes the description of the preferred embodiments of the invention. The following describes some alternative embodiments for accomplishing the present invention.

For example, any type of computer, such as a mainframe, minicomputer, work station or personal computer, could be used with the present invention. In addition, any type of software product where PTFs are provided between releases could benefit from the present invention. Further, the PTFs could be provided on a fixed and/or removable data storage device, or downloaded from a remote system via a data communications device.

Preferred embodiments discussed above also describe certain operations occurring at certain times. However, it should be appreciated that in alternative embodiments, the application program 34 may be invoked in alternative manners. The application program may be set to run automatically after the user installs a PTF or after the user invokes the application program 34. Alternatively, the application program 34 can provide the user with informational text within the PTF without installing the PTF. Still further, the application program 34 may produce information on the PTF different from the information discussed above.

In summary, the present invention discloses a method, apparatus, and article of manufacture for providing information to a user on modifications made to a base software product with a program temporary fix. The program temporary fix is applied to the base software product. The program temporary fix includes informational text describing how the program temporary fix modifies the base software product. The informational text included with the program temporary fix is applied to informational text provided with the base software product to generate cumulative informational text. The cumulative informational text describes the base software product as modified by the program temporary fix. The cumulative informational text may be accessed and presented to the user.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing information to a user on a software product that includes a base software product and modifications thereto supplied by a program temporary fix, comprising:

(a) applying the program temporary fix to the base software product, wherein the program temporary fix includes fix informational text describing how the program temporary fix modifies the base software product;

(b) applying the fix informational text included with the program temporary fix to base informational text embedded in the software product to generate cumulative informational text, wherein the base informational text describes program functions of the base software product wherein the cumulative informational text describes the base software product as modified by the program temporary fix, and wherein the cumulative informational text includes base information on the program functions unchanged as a result of the program temporary fix and fix information on changes to the program functions resulting from the program temporary fix;

(c) accessing the cumulative informational text; and (d) presenting the accessed informational text to the user, wherein the presented informational text comprises a portion of the cumulative informational text, including base information on the programs unchanged as a result of the program temporary fix and fix information on changes to the program functions resulting from the temporary fix.

2. The method of claim 1, wherein the program temporary fix further comprises at least one update to the software product and wherein the cumulative informational text describes the update to the base software product.

3. The method of claim 1, wherein the program temporary fix further comprises at least one fix to the base software product and wherein the cumulative informational text describes the fix to the base software product.

4. The method of claim 1, wherein the informational text includes:

a description of a date the program temporary fix was applied to the base software product.

5. The method of claim 1, wherein the step of presenting accessed cumulative informational text to the user includes one or more steps from the group of steps comprising:

printing the informational text;
displaying the informational text;
extracting the informational text; and
searching the informational text.

6. The method of claim 1, further comprising the steps of:

applying a second program temporary fix to a cumulative software product comprised of the base software product and the program temporary fix previously applied, wherein the second program temporary fix includes informational text describing how the second program temporary fix modifies the cumulative software product;

applying the informational text included with the second program temporary fix to the cumulative informational text to generate second cumulative informational text, wherein the second cumulative informational text describes the cumulative software product as modified by the second program temporary fix;

accessing the second cumulative informational text; and
presenting the accessed informational text to the user.

7. The method of claim 1, wherein the generated cumulative informational text is embedded within the software product.

8. The method of claim 1, wherein the fix informational text is embedded within the program temporary fix.

9. The method of claim 1, wherein the steps of applying the program temporary fix to the base product, applying the fix informational text included with the program temporary fix to the base informational text, accessing the cumulative informational text, and presenting the accessed informational text to the user are performed by an application program embedded within the software product.

10. The method of claim 1, wherein the fix informational text is applied to the base informational text when the program temporary fix is applied to the base product.

11. A computer programming apparatus for providing information to a user on a software product that includes a base software product and modifications thereto supplied by a program temporary fix, comprising:

(a) a computer having a memory;

(b) means, performed by the computer, for receiving the program temporary fix into the memory, wherein the program temporary fix includes fix informational text describing how the program temporary fix modifies the base software product;

(c) means, performed by the computer, for applying the program temporary fix to the base software product;

(d) means, performed by the computer, for applying the fix informational text included with the program temporary fix to base informational text embedded in the base software product to generate cumulative informational text into the memory, wherein the base informational text describes program functions of the base software product, wherein the cumulative informational text describes the base software product as modified by the program temporary fix, and wherein the cumulative informational text includes base information on the program functions unchanged as a result of the program temporary fix and fix information on changes to the program functions resulting from the program temporary fix;

(e) means, performed by the computer, for accessing the cumulative informational text in the memory; and (f) means, performed by the computer, for presenting the accessed informational text to the user, wherein the presented informational text comprises any of the cumulative informational text, including base information on the programs unchanged as a result of the program temporary fix and fix information on changes to the program functions resulting from the temporary fix.

12. The apparatus of claim 11, wherein the program temporary fix further comprises at least one update to the base software product and wherein the cumulative informational text describes the update to the base software product.

13. The apparatus of claim 11, wherein the program temporary fix further comprises at least one fix to the base software product and wherein the cumulative informational text describes the fix to the base software product.

14. The apparatus of claim 11, wherein the informational text includes:

a description of a date the program temporary fix was applied to the base software product.

15. The apparatus of claim 11, wherein the means, performed by the computer, for presenting cumulative informational text, further includes:

means, performed by the computer, for printing the informational text;

means, performed by the computer, for displaying the informational text;

means, performed by the computer, for extracting the informational text; and means, performed by the computer, for searching the informational text.

16. The apparatus of claim 11, further comprising:

means, performed by the computer, for receiving a second program temporary fix into the memory, wherein the second program temporary fix includes informational text;

means, performed by the computer, for applying the second program temporary fix to a cumulative software product comprised of the base software product and the program temporary fix previously applied, wherein the informational text provided with the second program temporary fix describes how the second program temporary fix modifies the cumulative software product;

means, performed by the computer, for applying the informational text provided with the second program temporary fix to the cumulative informational text to generate second cumulative informational text, wherein the second cumulative informational text describes the cumulative software product as modified by the second program temporary fix;

accessing the second cumulative informational text; and presenting the accessed informational text to the user.

17. The apparatus of claim 11, wherein the generated cumulative informational text is embedded within the software product.

18. The apparatus of claim 11, wherein the fix informational text is embedded within the program temporary fix.

19. The apparatus of claim 11, wherein the means for applying the program temporary fix to the base product, applying the fix informational text included with the program temporary fix to the base informational text, accessing the cumulative informational text, and presenting the accessed informational text to the user are performed by an application program embedded within the software product.

20. The system of claim 11, wherein the fix informational text is applied to the base informational text when the program temporary fix is applied to the base product.

21. An article of manufacture for use in programming a computer to provide information to a user on a software product that includes a base software product and modifications thereto supplied by a program temporary fix for use in programming a computer, the article of manufacture comprising a computer readable storage medium having a computer program embodied therein that causes the computer to perform:

(a) applying the program temporary fix to the base software product, wherein the program temporary fix includes informational text describing how the program temporary fix modifies the base software product;

(b) applying the informational text included with the program temporary fix to base informational text embedded in the base software product to generate cumulative informational text, wherein the base informational text describes program functions of the base software product, wherein the cumulative informational text describes the software product as modified by the program temporary fix, and wherein the cumulative informational text includes base information on the program functions unchanged as a result of the program temporary fix and fix information on changes to the program functions resulting from the program temporary fix;

(c) accessing the cumulative informational text; and (d) presenting the accessed informational text to the user, wherein the presented informational text comprises any of the cumulative informational text, including base information on the programs unchanged as a result of the program temporary fix and fix information on changes to the program functions resulting from the temporary fix.

22. The article of manufacture of claim 21, wherein the program temporary fix further comprises at least one update to the base software product and wherein the cumulative informational text describes the update to the base software product.

23. The article of manufacture of claim 21, wherein the program temporary fix further comprises at least one fix to the base software product and wherein the cumulative informational text describes the fix to the base software product.

24. The article of manufacture of claim 21, wherein the informational text includes:

a description of a date the program temporary fix was applied to the base software product.

25. The article of manufacture of claim 21, wherein the step of presenting accessed cumulative informational text to the user includes one or more steps from the group of steps comprising:

printing the informational text;

displaying the informational text;

extracting the informational text; and searching the informational text.

26. The article of manufacture of claim 21, wherein the computer program further causes the computer to perform the steps of:

applying a second program temporary fix to a cumulative software product comprised of the base software product and the program temporary fix previously applied, wherein the second program temporary fix includes informational text describing how the second program temporary fix modifies the cumulative software product;

applying the informational text included with the second program temporary fix to the cumulative informational text to generate second cumulative informational text, wherein the second cumulative informational text describes the cumulative software product as modified by the second program temporary fix;

accessing the second cumulative informational text; and presenting the accessed informational text to the user.

27. The article of manufacture of claim 21, wherein the generated cumulative informational text is embedded within the software product.

28. The article of manufacture of claim 21, wherein the fix informational text is embedded within the program temporary fix.

29. The article of manufacture of claim 21, wherein the steps of applying the program temporary fix to the base product, applying the fix informational text included with the program temporary fix to the base informational text, accessing the cumulative informational text, and presenting the accessed informational text to the user are performed by an application program embedded within the software product.

30. The article of manufacture of claim 21, wherein the fix informational text is applied to the base informational text when the program temporary fix is applied to the base product.

31. A method for providing information to a user on a software product that includes a base software product and modifications thereto supplied by a program temporary fix, comprising:
 (a) applying the program temporary fix to the base software product, wherein the program temporary fix includes fix informational text describing how the program temporary fix modifies the base software product;
 (b) applying the fix informational text included with the program temporary fix to base informational text embedded in the software product when applying the program temporary fix to generate cumulative informational text, wherein the base informational text describes program functions of the base software product, wherein the cumulative informational text describes the base software product as modified by the program temporary fix;
 (c) accessing the cumulative informational text; and
 (d) presenting the accessed informational text to the user, wherein the presented informational text comprises a portion of the cumulative informational text, including base information on the programs unchanged as a result of the program temporary fix and fix information on changes to the program functions resulting from the temporary fix.

32. An article of manufacture for providing information to a user on a software product that includes a base software product and modifications thereto supplied by a program temporary fix, comprising:
 (a) applying the program temporary fix to the base software product, wherein the program temporary fix includes fix informational text describing how the program temporary fix modifies the base software product;
 (b) applying the fix informational text included with the program temporary fix to base informational text embedded in the software product when applying the program temporary fix to generate cumulative informational text, wherein the base informational text describes program functions of the base software product, wherein the cumulative informational text describes the base software product as modified by the program temporary fix;
 (c) accessing the cumulative informational text; and
 (d) presenting the accessed informational text to the user, wherein the presented informational text comprises a portion of the cumulative informational text, including base information on the programs unchanged as a result of the program temporary fix and fix information on changes to the program functions resulting from the temporary fix.

* * * * *